June 24, 1958
P. MAKER
2,839,874
MACHINE CONTROL MECHANISM
Filed April 23, 1956
7 Sheets-Sheet 1
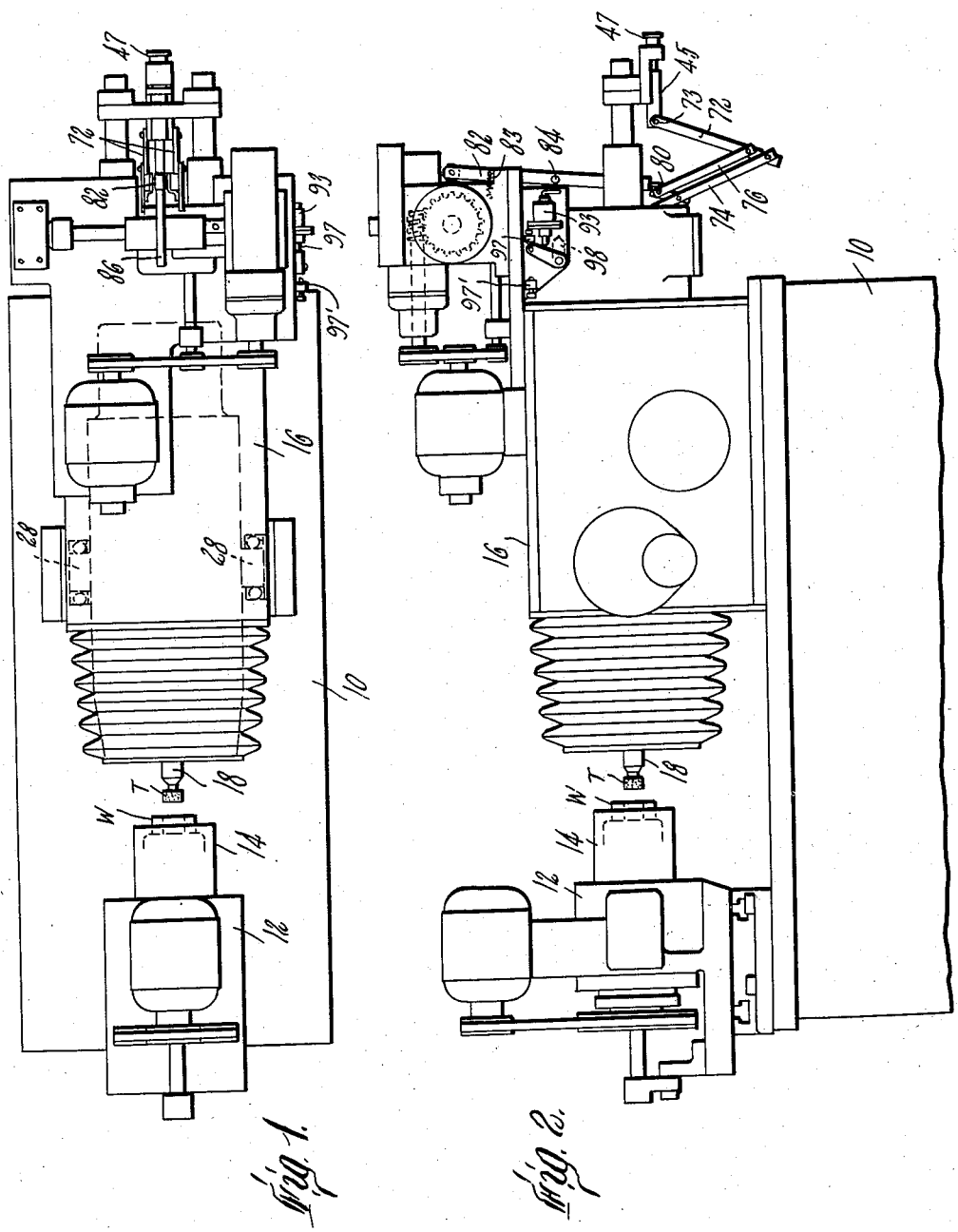

June 24, 1958 P. MAKER 2,839,874
MACHINE CONTROL MECHANISM
Filed April 23, 1956 7 Sheets-Sheet 2
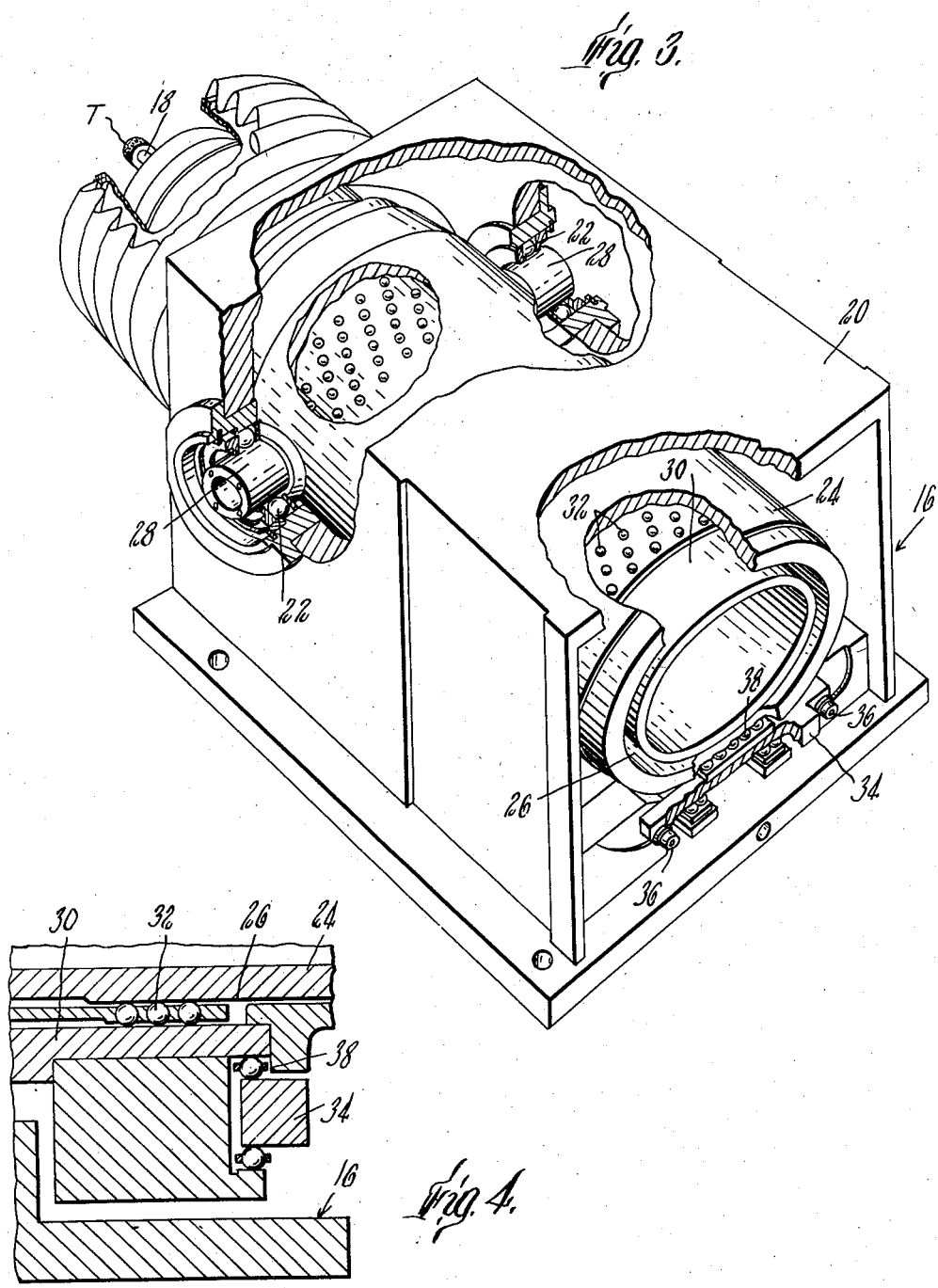

June 24, 1958 P. MAKER 2,839,874
MACHINE CONTROL MECHANISM
Filed April 23, 1956 7 Sheets-Sheet 3
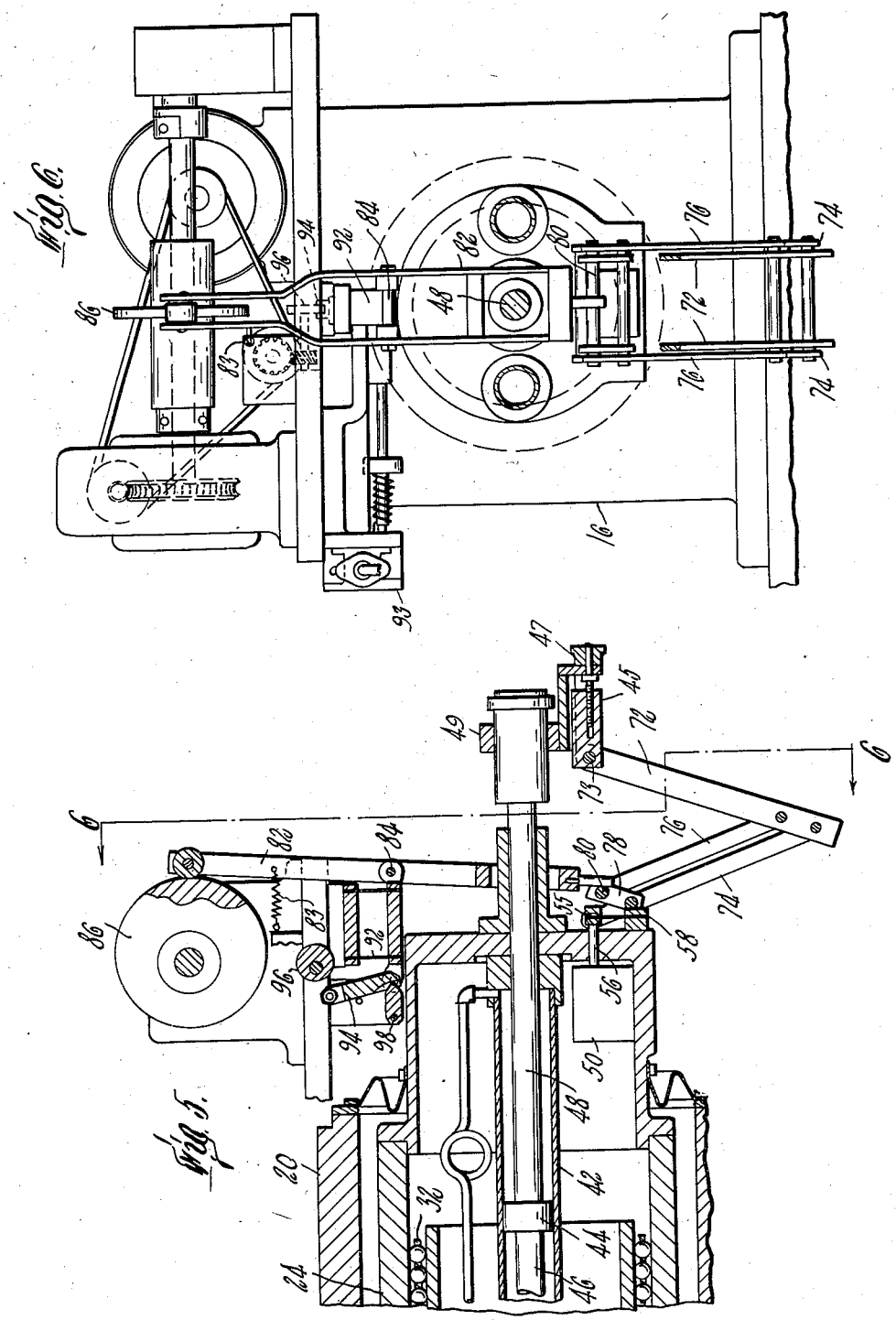

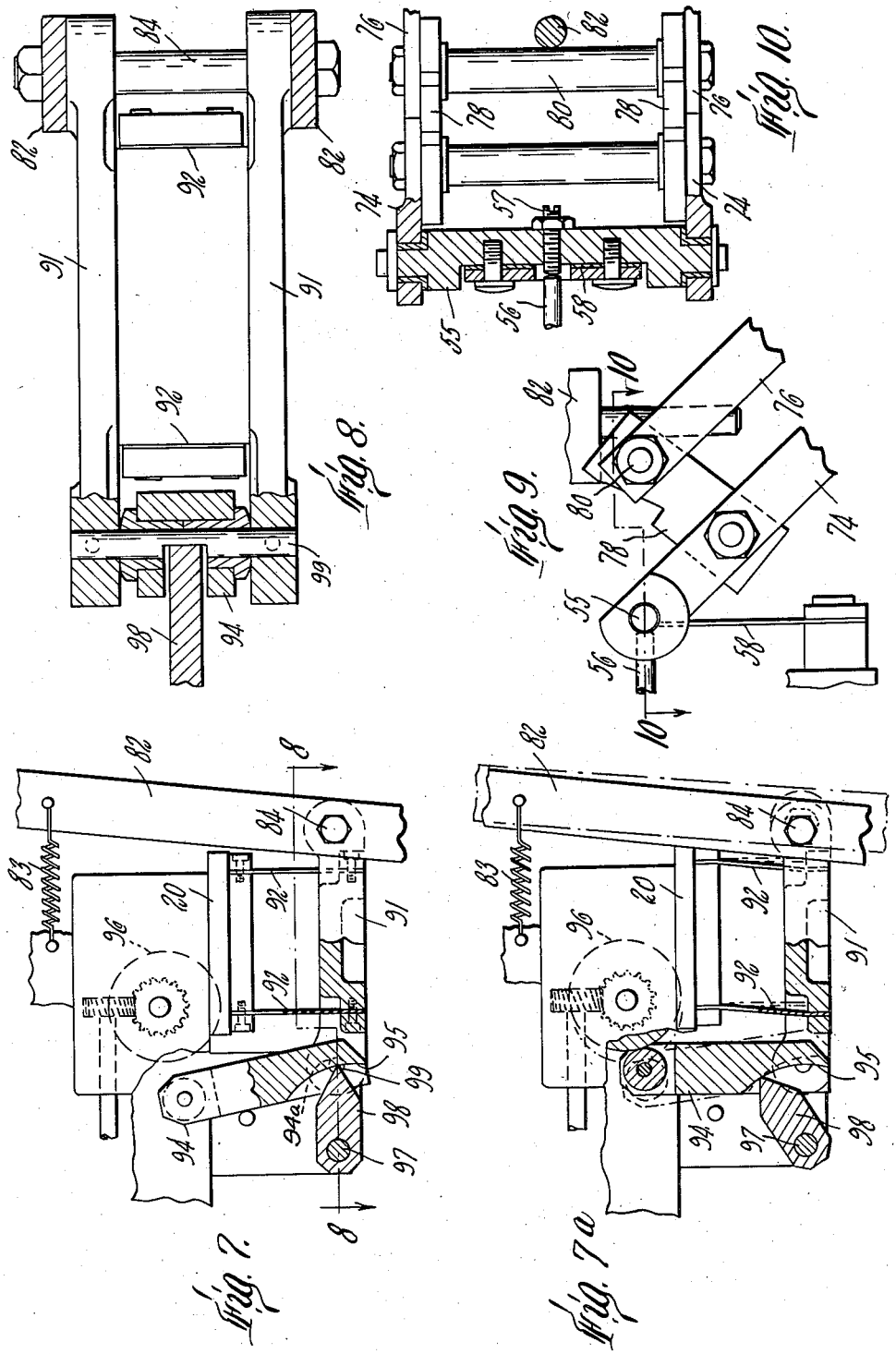

June 24, 1958 P. MAKER 2,839,874
MACHINE CONTROL MECHANISM
Filed April 23, 1956 7 Sheets-Sheet 5
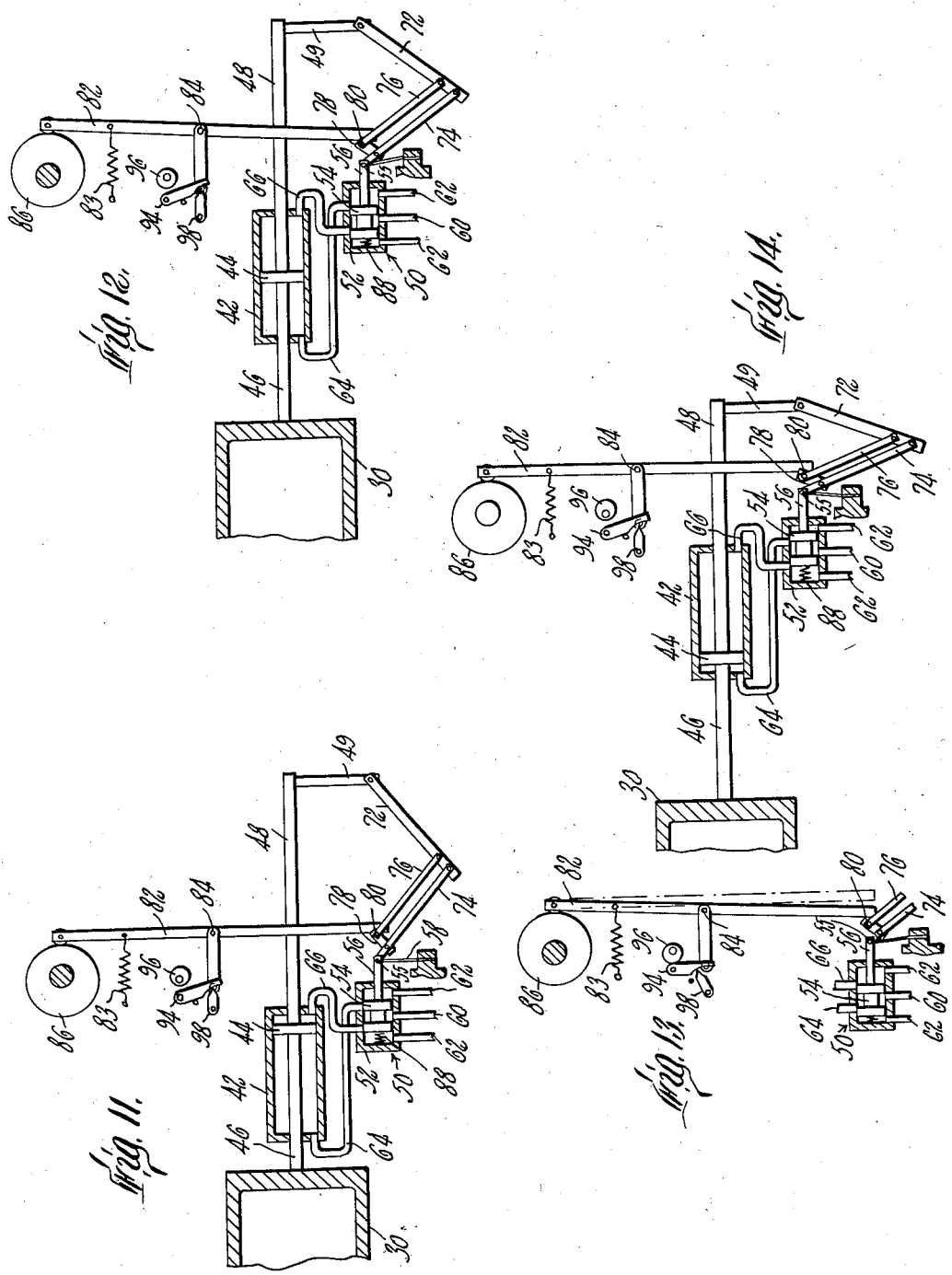

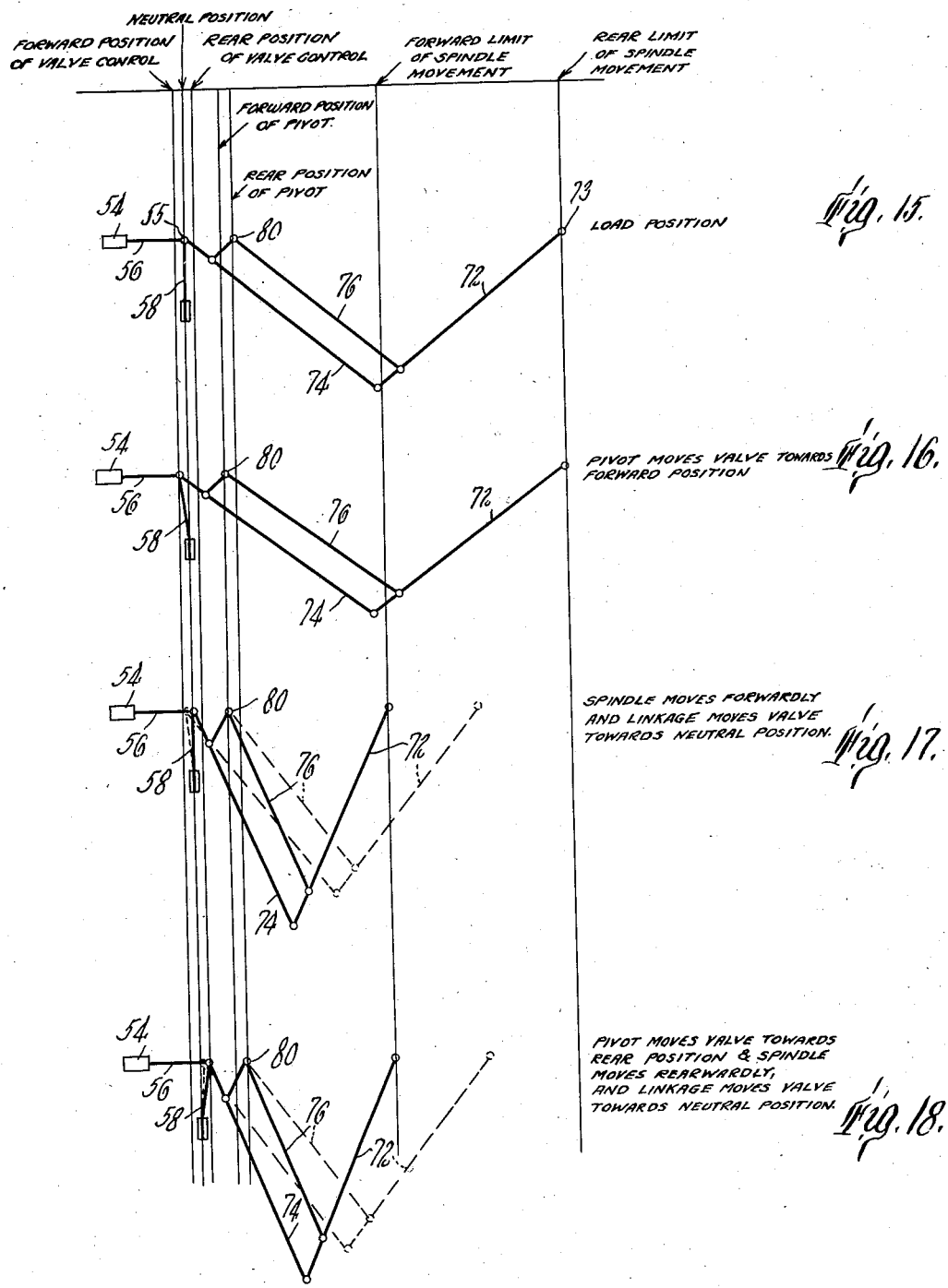

June 24, 1958

P. MAKER 2,839,874

MACHINE CONTROL MECHANISM

Filed April 23, 1956

GRINDING ZONE   DRESSING ZONE   LOAD POSITION

United States Patent Office 2,839,874
Patented June 24, 1958

2,839,874

MACHINE CONTROL MECHANISM

Paul Maker, Springfield, Vt., assignor to Bryant Chucking Grinder Company, Springfield, Vt., a corporation of Vermont Application April 23, 1956, Serial No. 580,037

8 Claims. (Cl. 51—50)

This invention relates to machine tools, and more particularly, to novel means for controlling the acceleration, speed and position of an element thereof.

In general a machine tool often includes an element e. g. a slide arranged for a longitudinal reciprocating movement in a more or less complex cycle and with more or less exacting demands on repeatability in speed and position, as well as freedom from spurious oscillation during critical phases of the controlling system. A typical example of such machines is described in Patent No. 2,429,830 where hydraulic means are in general applied to power input and control, and in Patent No. 2,677,921 where mechanical means are used for the same purpose. Both of said systems, notwithstanding certain inherent weaknesses, have fulfilled the requirements and still do in a general way. However, modern demands for ultimate precision, at a high rate of production in many instances, point towards the necessity of a new approach to machine control while at the same time requiring that such control should be simple and easy to adjust and maintain.

It is an object of this invention to provide a novel control of power means for actuating a reciprocating slide or other element, such control being arranged to provide a continuous response derived from the output of the power means.

Another object of the invention is to adapt the control means to provide various modes of reciprocation to the machine element.

A further object is to provide control means of compact design and great versatility which nevertheless is relatively uncomplicated and troublefree in operation.

Still a further object is to provide a control means actuated by a mechanism requiring but a minimum of power in combination with a hydraulic amplifier for executing the desired work in response to the control means.

It is a particular feature of the invention that the control means may be quickly modified to meet different job requirements.

Further objects and advantages will appear in the following description of a preferred embodiment of the invention when taken with the accompanying drawings, in which:

Fig. 1 is a plan view of an internal grinding machine embodying the invention;

Fig. 2 is a side elevation of the machine of Fig. 1;

Fig. 3 is a perspective view, partly broken away, showing the tool spindle supporting structure of the machine of Figs. 1 and 2;

Fig. 4 is an enlarged view of a portion of the structure of Fig. 3;

Fig. 5 is an enlarged side cross sectional elevation of a portion of the machine of Figs. 1 and 2 illustrating the reciprocating means of the invention;

Fig. 6 is an enlarged end elevation of the reciprocating means of Fig. 5;

Fig. 7 is a side elevation partly broken away of a detail of the means of Figs. 5 and 6 showing the oscillating means of the invention in a first position.

Fig. 7a is a side elevation partly broken away of a detail of the means of Figs. 5 and 6 showing the oscillating means of the invention in a second position.

Fig. 8 is a cross-sectional plan of the oscillating means of Fig. 7;

Fig. 9 is a side elevation of a detail of the means of Figs. 5 and 6, showing a portion of the feedback means of the invention;

Fig. 10 is a plan view of the means of Fig. 9;

Figs. 11–14 are diagrammatic views of the tool spindle means of Figs. 5 and 6 illustrating progressive stages in its operation;

Figs. 15–18 are interrelated graphical presentations of the reciprocating means of the invention illustrating the degree and direction of movement of certain of its elements during progressive stages in its operation;

Figure 19:
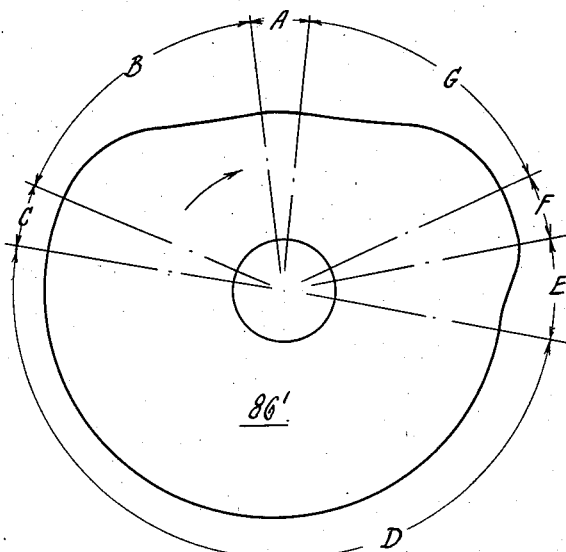
Fig. 19 is a view of a modified operating cam providing a more complicated work cycle.

Referring first to Figs. 1 and 2 of the drawings wherein an embodiment of the invention in an internal grinding machine is shown by way of example, there is indicated at 10 a base structure of the machine on one end of which is mounted the workhead 12 including its workpiece carrying spindle 14 for supporting and driving a workpiece W on which a surface of revolution is to be generated. On the other end of said base is mounted a toolhead or tool spindle means generally indicated at 16, which contains a high speed rotatable tool spindle 18 with its tool T which, together with its driving means are mounted coaxially inside a slide. The slide comprises part of said tool spindle structure, which is adapted for reciprocatory movement along the axis of said tool spindle. The tool spindle means 16 is supported for pivotal movement about and for transverse movement along an axis coplanar with and at right angles to the axis of said tool spindle, said last-named axis being generally parallel and coplanar with the axis of the workpiece carrying spindle 14. The tool spindle means is further supported at its outboard end so as to permit said pivotal as well as said transverse movement.

In Fig. 3 is shown the tool spindle means and its supporting outer housing 20 in more detail. Thus, the rotating and reciprocating elements of toolhead 16 are contained in a cylindrical housing 24 with an internal bore 26 extending therethrough. Extending from housing 24 are two diametrically-spaced trunnions 28 with cylindrical surfaces having a common axis, said axis being in the same plane with and intersecting the axis of bore 26 at 90 degrees. By means of said trunnions, the cylindrical housing 24 is mounted for pivotal movement about the axis of said trunnions within the outer housing 20 by means of suitable preloaded ball bearings 22 therein, the axis of said bearings being coplanar with and perpendicular to the axis of tool spindle 18. Coaxial with bore 26 is mounted a tubular slide 30 for reciprocatory movement along the axis of said bore, and between said slide 30 and said bore 26 are arranged a plurality of preloaded balls 32 supporting said slide for reciprocatory movement, the tool spindle 18 being supported in said slide and being driven at high rotational speed by any suitable means such as an electric or hydraulic motor. On the free end of said spindle is mounted the grinding wheel or tool T for the purpose of generating an internal surface of revolution on the workpiece W. Means, best shown in Fig. 4, are further provided for supporting the outboard end of housing 24 remote from trunnions 28 at the opposite end of outer housing 20. Thus, slightly inboard of the end of housing 20 is mounted a transversely extending supporting bar 34 arranged for vertically adjustable positioning by means of machine bolts 36, said bar supporting inner cylindrical housing 24 by means of ball slide members 38 mounted thereon. A feed movement in transverse direction to the axis of tool spindle 18 is imparted to tool T by moving the inner housing 24 along the axis of trunnions 28 by suitable automatic or manual means well known to the art and not herein shown.

A double-acting hydraulic cylinder 42 with its piston 44 constitutes the power means for imparting the linear reciprocatory movement to the tool spindle means or other element. As best shown in Figs. 5 and 11 through 14, the forward connecting rod 46 of said piston is mounted on the rear end of slide 30, and the rear connecting rod 48 of said piston extends outwardly through the rear end of cylinder 42 to provide a free end movable with the tool spindle means and its grinding tool T.

According to the present invention, the power cylinder 42 is furnished with a pressurized fluid medium for reciprocating the tool spindle means in either direction over an adjustably predetermined stroke by novel control means. Such control means includes a four way control element or valve having a neutral position and oppositely acting power input positions on either side thereof, said valve being generally indicated at 50; feedback means connected between the valve and the power means at the free end of rear connecting rod 48 to impart a movement to the said control valve in an opposite sense to the sense of a movement imparted to the valve by a reference input means. As later described, said movements take place simultaneously at relative velocities adapted to control the acceleration of the tool spindle means, and to terminate its movement at an adjusted predetermined position. Said reference input means initiates the stroke of the tool spindle means in either direction by displacing the valve 50 away from its neutral position in the coresponding direction, while simultaneously the means actuated from the output movement of the tool spindle means tends to restore the valve towards its neutral position. The stroke acceleration may be determined by varying the rate at which the input reference means is applied and the length of stroke may be determined by appropriate positioning of the feedback means. Also, independent of the above described reference input means, reciprocation in a different mode may be readily superimposed on the tool spindle means cycle during any position thereof, if and when desired.

More specifically, as best shown in Figs. 5, 9 and 10, and more diagrammatically in Figs. 11 through 14 and 15 through 18, the four way control valve 50 is of a generally well known type including a cylinder 52 and a spool-like piston element 54 having its connecting rod 56 extending rearwardly through cylinder 52. A central inlet 60 for a pressurized fluid medium such as suitable hydraulic fluid is provided in said cylinder, and exhaust outlets 62 are provided at the ends thereof. Connections 64 and 66 are provided between the control valve cylinder 52 and the ends of power cylinder 42, the openings of said connections in said control valve cylinder being spaced from one another and positioned to be both closed by the spool-like piston element 54 when in a neutral position (Fig. 11) and to connect one of said connections to inlet 60 and the other of said connections to an exhaust outlet 62 when piston element 54 is displaced from said neutral position to a power input position (Figs. 12 and 14).

The rate of power transmission is variable according to the nature of the movement imparted to the valve piston element in moving it away from its neutral position, due to the corresponding variation in the opening of the valve. This provides a means of control of the acceleration of the tool spindle means.

To displace the control valve piston element 54, lever means is provided for connection between the power means rear connecting rod 48 and the control valve connecting rod 56, such lever means including a plurality of levers pivoted to one another and having a pivot 80 constituting a first control point movable between predetermined positions. As herein shown, the lever means is in the form of a parallelogram lever system wherein the pivot 80 is displaced a predetermined fraction of the displacement of the power means connecting rod. However, other types of pivoted lever means may be used.

Thus, levers 72 are pivotally connected at 73 to a slide means which in turn is supported by downwardly extending lugs 49, at the end of the power means connecting rod 48. The pivotal connection 73 between the levers 72 and the slide means 45 is on the axis of movement of control valve connecting rod 56. Said slide means have a screw threaded element 47 cooperating with rod 48 so that the slide means may be moved along the rod 48 thereby moving the said pivot to provide an adjustment of the stroke of the power means. At the lower end of said levers 72 are pivotally mounted in spaced positions two pairs of parallel levers 74 and 76. The lower pair of levers 74 has a pivot shaft 55 constituting a second control point supported on the toolhead outer housing by means of a flat leaf spring or reed 58. The pivot shaft 55 mounts an adjusting screw 57 abutting connecting rod 56, said screw providing for the adjustment of the position of the valve spool relative to shaft 55 (Figs. 9 and 10). The upper pair of levers 76 is connected to the lower lever 74 by a pair of levers 78 in spaced parallel relation to levers 72, the length of said levers 78 between their pivots being a fraction of the length of levers 76 between their pivots so as to provide the requisite fractional movement of pivot 80 and pivot shaft 55 relative to the movement of pivot 73. The pivot 80 between levers 76 and 78 is constrained to move in response to the movement of a cam follower lever 82 which is pivotally mounted on a pivot shaft 84, and which is movable between predetermined positions by a cam 86, the lever being held against the cam by a spring means 83. Said parallelogram lever system is loaded by a compression spring 88 interposed between the forward end of control valve piston 54 and its cylinder 52 to urge the pivot 80 into contact with cam follower lever 82 at all times so that said pivot 80, in effect, has a position in space determined by the instant position of lever 82. The range of said constrained movement of pivot 80 may be adjusted by varying the swing or angular displacement of cam follower lever 82 as by changing the cam 86. By rotating the cam 86, through a half revolution, for example, the lever system will displace pivot shaft 80 effecting a movement of valve spool 54 away from its neutral position to provide a reference input which initiates and sustains the movement of the tool spindle means.

By imposing an oscillating movement on pivot shaft 84 there can also be superimposed on the tool spindle means a short stroke reciprocatory, longitudinal movement as is desirable e. g. during the grinding phase of the machine cycle, as is well known in the art. A preferred mechanism to execute such oscillating movement is shown in Figs. 5, 7 and 8, and diagrammatically in Fig. 13. From outer housing 20 is suspended a yoke 91 by means of a pair of spaced parallel spring steel members or reeds 92. In one end of the yoke is journaled pivot shaft 84, and in the other end is journaled on pin 94a (Fig. 7) a lever 94 having an arch formed cam surface 95 with a radius the center of which coincides with the pivotal center 97 of a lever 98 journaled in outer housing 20. Lever 98 is formed with an edge 99 at its outer end. In normal position the axis of pivot 84, edge 99 and center 97, are located along a line in a common plane; and the reeds 92 are biased by the force of spring 83 holding cam surface 95 in firm engagement with edge 99 under all conditions. In this said normal position, pivot shaft 84 is fixed in space. By swinging lever 98 upwardly to some predetermined position, edge 99 riding against cam surface 95 will force the uppermost end of lever 94 into contact with an eccentric cam 96, which in the preferred embodiment rotates continuously. The lever 94 will now have its fulcrum at the point of contact between edge 99 and cam surface 95 remote from said normal position, with the result that yoke 91 and so also pivot shaft 84 will be caused to oscillate as the cam 96 rotates. The magnitude of such oscillatory movement will be dependent on the eccentricity of the cam 96 and the amount of upward movement of lever 98. The said swinging movement of lever 98 may be effected by any suitable means, such as a hydraulic cylinder indicated at 93 in Figs. 2 and 6. The amount of upward movement of edge 99 can be variably adjusted by limit stops in the form of screw means for example, generally indicated at 97 and 97' in Fig. 2, where 97 establishes the normal position, and 97' the adjustable actuating position. Accordingly the oscillations of the lever 82 are translated into an oscillation of the tool spindle means through oscillation of the valve piston element about its neutral position.

In the operation of the above-described mechanism, as best shown diagrammatically in Figs. 11 through 14, and graphically in Figs. 15 through 18, assume that the work cycle begins in the rearwardmost position of the tool spindle means with the pivot shaft 80 in its rearward position (Figs. 11 and 15). When the pivot 80 is in such position, the valve 50 is in its neutral or off position, and the system remains at rest. When the pivot 80 is moved forwardly away from its rearward position, by rotating cam 86 from its low towards its high position and thereby moving lever 82, the control valve piston 54 is moved towards the left, away from its neutral position (Fig. 16) to admit fluid under pressure to the rear end of power cylinder 42. This initiates a movement on the tool spindle means in a forward direction to the left. As the tool spindle means moves forward (Fig. 12 and dotted lines of Fig. 17), the parallelogram lever system is swung by such forward movement about its pivot 80 to simultaneously move valve 50 in the opposite direction, thereby controlling the acceleration of the tool spindle means. When the movement of lever 82 ceases the valve is returned by the lever system to its neutral or off position, at which time the tool spindle means is stopped in a forward rest position (solid lines of Fig. 17).

At the forward limit of movement of the tool spindle means or at any other time when the valve is in neutral position, the short stroke reciprocatory movement may be imparted thereto by cam 96 (Fig. 13) as described heretofore.

To initiate rearward movement of the tool spindle means (Figs. 14 and solid lines of Fig. 18) pivot shaft 80 is returned towards its initial rearward position by rotating cam 86 from its high to its low position. As a result valve 50 is opened in the opposite direction (moved to the right) to admit fluid to the opposite side of power cylinder 42, and, as before, the parallelogram lever system is swung about pivot 80 and controls the acceleration of the tool spindle means. When the lever 82 under the influence of cam 86 comes to rest, the valve is returned once again by the lever system to its neutral position (Fig. 18), stopping the tool spindle means in its rearward rest position and completing the cycle (Figs. 11 and 15).

A typical example of a more complicated work cycle for an internal grinding machine is shown in Figs. 20 through 25. Such a cycle, well known in the art may be programmed by suitable means to have the following phases: grinding wheel T is initially located in a position longitudinally remote from the workpiece W or the grinding zone; the grinding wheel is caused to advance into said zone and execute the rough grinding phase of the cycle; afterward, during an extended shorter longitudinal withdrawal, a wheel dressing phase is carried out; again the grinding wheel T is returned to the grinding zone to execute the finish grinding phase; and finally the grinding wheel is returned to the aforesaid remote position to complete one cycle.;

For such a cycle, a more complicated program cam 86' is used having a configuration as in Fig. 19 with the periphery subdivided into seven portions, designated as A through G, for governing the various phases of the cycle set forth above.

Figure 20:
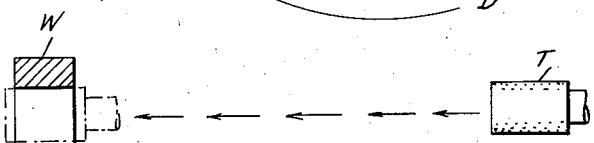
Figs. 20–25 are diagrammatic presentations illustrating the movement of the workpiece and grinding wheel as operated by the cam of Fig. 19.
Figure 21:
Figure 22:
Figure 23:
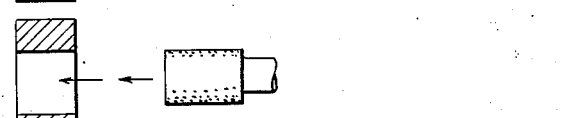
Figure 24:
Figure 25:
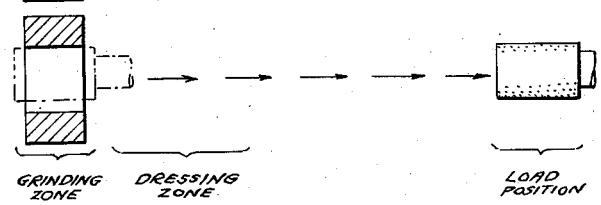

In the first phase, the cam 86' is stationary with the lever 82 resting against cam portion A, the tool spindle means being in the position shown in Fig. 11, and the grinding wheel T located in a position remote from the grinding zone (Fig. 20). The cam 86' is now rotated in a clockwise direction, as shown, so that the portion B contacts the lever and initiates the forward stroke as in Fig. 12, thereby advancing the grinding wheel T towards the grinding zone. When portion C of the cam comes in contact with the lever, the cam 86 is stopped in the grinding zone (Fig. 21) and the rough grinding phase is commenced. After the end of said phase, the cam is again put in motion and portion D, which has gradually diminishing radii, imparts an extended and comparatively slow speed stroke to the tool spindle means, in a direction outwardly, away from the grinding zone (Fig. 22). A diamond dressing tool is now positioned in the path of the periphery of grinding wheel T for the purpose of dressing the wheel in a manner well known to the art. When the wheel has passed the dressing tool, and just before the lever 82 leaves zone D, the dressing tool is withdrawn. The cam continues its movement through the steep portion E and imparts a fast return (Fig. 23) of the tool spindle means to the grinding zone (Fig. 24), and the cam is again stopped with portion F contacting the lever 82. At this time the finish grind phase is commenced, after which the cam is again started, and the cam portion G caused to contact the lever, whereby a return stroke as in Fig. 14 is initiated. Finally when zone A contacts the lever the cam stops and one cycle is completed (Fig. 25).

From the above, it will be clear that the cam 86, has an intermittent movement, and through lever 82, provides an input signal corresponding to the displacement of valve 50 in one directional sense away from its normal or neutral position which initiates and sustains a longitudinal movement of the tool spindle means. Simultaneously the feedback means comprising the lever system connected between rod 48 and valve 50 transmits an opposite signal in response to the movement of rod 48 by imparting a movement on said valve in the opposite sense. As the tool spindle means approaches a predetermined new position, the input signal ceases, and the valve is returned to its neutral position by the output signal.

According to the present invention as set forth hereinabove, means are also provided for superimposing a short stroke reciprocatory movement on the tool during grinding, it being desirable that such movement occur comparatively rapidly, as is known in the art. When the cam is stopped with either portion C or F in contact with lever 82 (Figs. 21 and 24) so that the lever is at a standstill, the pivot 84 of said lever is arranged so that it can be made to oscillate. Hence its lower end will effect an oscillatory movement of the control valve about its neutral position causing a stroking of the tool spindle means in response to such oscillatory movement, as shown in Fig. 13.

Thus, it will be seen that I have provided a novel reciprocating means for reciprocating a machine tool element through an adjustably predetermined stroke comprising continuous control means governing the rate of acceleration, range and position of the said stroke, and including means for selectively imposing different modes of reciprocatory movements; in combination with a hydraulic power amplifier, the elements thereof being comparatively simple and contained in a minimum of space.

I claim:

1. In a machine tool having a linearly movable part, mechanism for reciprocating said part in a predetermined controlled mode, said mechanism comprising: fluid actuated power means to transmit power in opposite senses to said part, said power means including a fluid distributing valve having a power shut-off neutral position and being movable away from said position in opposite directions to actuate said power means; and control means for said valve having two independently actuated control elements, a first of said elements being operable to move said valve away from said neutral position, and the second of said elements being operable to restore said valve to said neutral position, said second element being operatively connected to said part; said control means comprising a lever system, and said control elements comprising first and second control points of said lever system, said second control point being operable to cause movement of said valve in an amount corresponding to a predetermined fraction of the movement of said part; and said lever system comprising four levers pivotally connected to one another in the form of a parallelogram, a first of said levers being pivotally connected at one of its ends to said part, a second of said levers being pivotally connected at one of its ends to the other end of said first lever and providing at its other end said second control point, a third of said levers being pivotally connected at one of its ends to said first lever at a point intermediate the ends of the latter and providing at its other end said first control point, and the fourth lever being pivotally connected at one of its ends to said third lever at said first control point and at the other of its ends being pivotally connected to said second lever intermediate the ends thereof, the length of said fourth lever being equal to the distance between the pivotal connections of said second and third levers to said first lever, and the distance between said second control point and the connection of said fourth lever to said second lever being equal to the length of said fourth lever.

2. A mechanism according to claim 1 wherein the loci of said first and second control points and the pivotal connection to said part lie on a single straight line coincident with the axis of said valve and parallel to the direction of movement of said part.

3. A mechanism according to claim 2 including a cam to move said first control point in a timed cycle.

4. A mechanism according to claim 3 including a fifth lever swingable about a pivot intermediate the ends of said lever in response to a radial displacement of the cam surface, a first end of said lever contacting said cam and the second end of said lever being connected to said first control point; and spring means connected to said lever intermediate said pivot and said first end to hold said lever against said cam.

5. A mechanism according to claim 4 including means for reciprocating said pivot to cause said lever to oscillate about said first end and thereby produce an additional mode of reciprocation of said part.

6. In a machine tool having a linearly movable part, a mechanism for reciprocating said part in a predetermined controlled mode, said mechanism comprising fluid actuated means to transmit power in opposite senses to said part, a fluid valve including a piston to control the flow of fluid to said power means, said piston having a power shut-off neutral position and being axially movable toward and away from said neutral position in opposite directions, a lever system including four levers pivotally connected to one another at points defining a parallelogram, one end of a first of said levers extending beyond its point of connection to a second of said levers and being pivotally connected to said valve piston, one end of a third of said levers extending beyond its point of connection to a fourth of said levers and being pivotally connected to said part at a point aligned axially with the valve piston, and means to produce movement along said axial line of the point of connection between the second and fourth levers.

7. A mechanism as claimed in claim 6 wherein said last-named means comprises an intermittently rotatable cam, a control lever swingable in a plane parallel to the axis of said piston, said control lever being pivotally supported at a point intermediate its ends, a follower mounted on one end of said control lever, first spring means acting on said control lever to urge said follower into contacting relation with said cam, second spring means acting on said piston to urge the point of connection between said second and fourth levers toward the other end of said control lever, and a connecting member at said last-named point adapted for relative transverse movement with respect to said control lever while in contact therewith.

8. A mechanism as claimed in claim 7 including means to produce oscillatory movement of said control lever about a fulcrum corresponding to the point of contact between said cam and said follower.

References Cited in the file of this patent

UNITED STATES PATENTS

| | | |
|---|---|---|
| 623,152 | Herdman | Apr. 18, 1899 |
| 1,098,548 | Baader | June 2, 1914 |
| 1,480,940 | Lang | Jan. 15, 1924 |
| 2,055,530 | Hallenbeck | Sept. 29, 1936 |
| 2,569,526 | Johnson | Oct. 2, 1951 |
| 2,727,359 | Staller | Dec. 20, 1955 |